US007286979B2

(12) United States Patent
Maeda et al.

(10) Patent No.: US 7,286,979 B2
(45) Date of Patent: Oct. 23, 2007

(54) COMMUNICATION TERMINAL AND COMMUNICATION SYSTEM

(75) Inventors: Kazuhiro Maeda, Yokohama (JP); Shoichirou Funato, Kamakura (JP); Toshio Kamimura, Yokohama (JP)

(73) Assignee: Hitachi, Ltd., Tokyo (JP)

(*) Notice: Subject to any disclaimer, the term of this patent is extended or adjusted under 35 U.S.C. 154(b) by 874 days.

(21) Appl. No.: 10/614,117

(22) Filed: Jul. 8, 2003

(65) Prior Publication Data

US 2004/0117174 A1 Jun. 17, 2004

(30) Foreign Application Priority Data

Dec. 13, 2002 (JP) ............................ 2002-361604

(51) Int. Cl.
*G10L 21/00* (2006.01)
*G10L 15/00* (2006.01)
*H04L 29/08* (2006.01)

(52) U.S. Cl. .................... 704/201; 704/235; 455/414.4

(58) Field of Classification Search ................ 704/235, 704/201

See application file for complete search history.

(56) References Cited

U.S. PATENT DOCUMENTS

| | | | | |
|---|---|---|---|---|
| 4,975,957 A * | 12/1990 | Ichikawa et al. | ........... | 704/220 |
| 5,687,221 A | 11/1997 | Oheda et al. | | |
| 5,696,879 A * | 12/1997 | Cline et al. | ................. | 704/260 |
| 6,173,250 B1 * | 1/2001 | Jong | ............................. | 704/3 |
| 2002/0037711 A1 * | 3/2002 | Mizutani | .................... | 455/414 |
| 2003/0065503 A1 * | 4/2003 | Agnihotri et al. | .............. | 704/7 |

FOREIGN PATENT DOCUMENTS

| | | |
|---|---|---|
| JP | 4302561 | 10/1992 |
| JP | A-08-065254 | 8/1994 |
| JP | A-7-87220 | 3/1995 |
| JP | 09284210 | 10/1997 |
| JP | A-2000-004304 | 6/1998 |
| JP | A-11-261720 | 9/1998 |
| JP | A-2001-148713 | 11/1999 |
| JP | A-2001-156912 | 11/1999 |
| JP | A-2002-162983 | 11/2000 |
| JP | 2001168961 | 6/2001 |
| JP | 2002084518 | 2/2002 |
| JP | 2002271530 | 9/2002 |

* cited by examiner

*Primary Examiner*—David Hudspeth
*Assistant Examiner*—Samuel G Neway
(74) *Attorney, Agent, or Firm*—Mattingly, Stanger, Malur & Brundidge, P.C.

(57) ABSTRACT

The communication terminal is comprised of: a voice input unit for inputting voice; a voice converting unit for converting the voice inputted into a voice signal; a character converting unit for converting the voice signal into a character signal; a transmitting unit capable of transmitting both the voice signal and the character signal via a communication line; and a control unit for controlling the transmitting unit in such a manner that the transmitting unit transmits the voice signal, or the character signal in response to a condition of the communication line. Also, the communication terminal is comprised of: a receiving unit capable of receiving both a voice signal and a character signal; an output unit for outputting the voice signal received by the receiving unit; and a display unit for displaying thereon the character signal received by the receiving unit.

5 Claims, 8 Drawing Sheets

COMMUNICATION TERMINAL AND COMMUNICATION SYSTEM

BACKGROUND OF THE INVENTION

The present invention is related to a communication terminal capable of performing both voice communications and character communications, and also related to a communication system with employment of this communication terminal.

A communication method has been proposed in, for example, JP-A-No. 2002-162983 in which voice information transmitted from a sender terminal is converted into character information and then this character information is transmitted to a receiver terminal by a voice/character bidirectional converting server.

In the above-described method, the voice/character information converting operations are carried out by the server. As a result, in the case that a communication condition defined from a sender terminal up to a communication firm and the like is deteriorated, voice data cannot be transmitted from this sender terminal to the server, so that communications between the sender and the receiver are interrupted, resulting in inconvenient utilization of the communication terminal.

SUMMARY OF THE INVENTION

To provide both a user-friendly communication terminal and a communication system with employment of this user-friendly communication terminal, the communication terminal, according to an aspect of the present invention, is featured by comprising: a voice input unit for inputting voice; a voice converting unit for converting the voice inputted by the voice input unit into a voice signal; a character converting unit for converting the voice signal converted by the voice converting unit into a character signal; a transmitting unit capable of transmitting both the voice signal and the character signal via a communication line; and a control unit for controlling the transmitting unit in such a manner that the transmitting unit transmits the voice signal, or the character signal in response to a condition of the communication line. Also, the second communication terminal is comprised of: a receiving unit capable of receiving both a voice signal and a character signal; an output unit for outputting the voice signal received by the receiving unit; and a display unit for displaying thereon the character signal received by the receiving unit. Since the communication terminal is arranged by the above-explained structures, even when a communication condition is deteriorated, the information can be transmitted/received.

Other objects, features and advantages of the invention will become apparent from the following description of the embodiments of the invention taken in conjunction with the accompanying drawings.

DETAILED DESCRIPTION OF THE EMBODIMENTS

Figure 1:
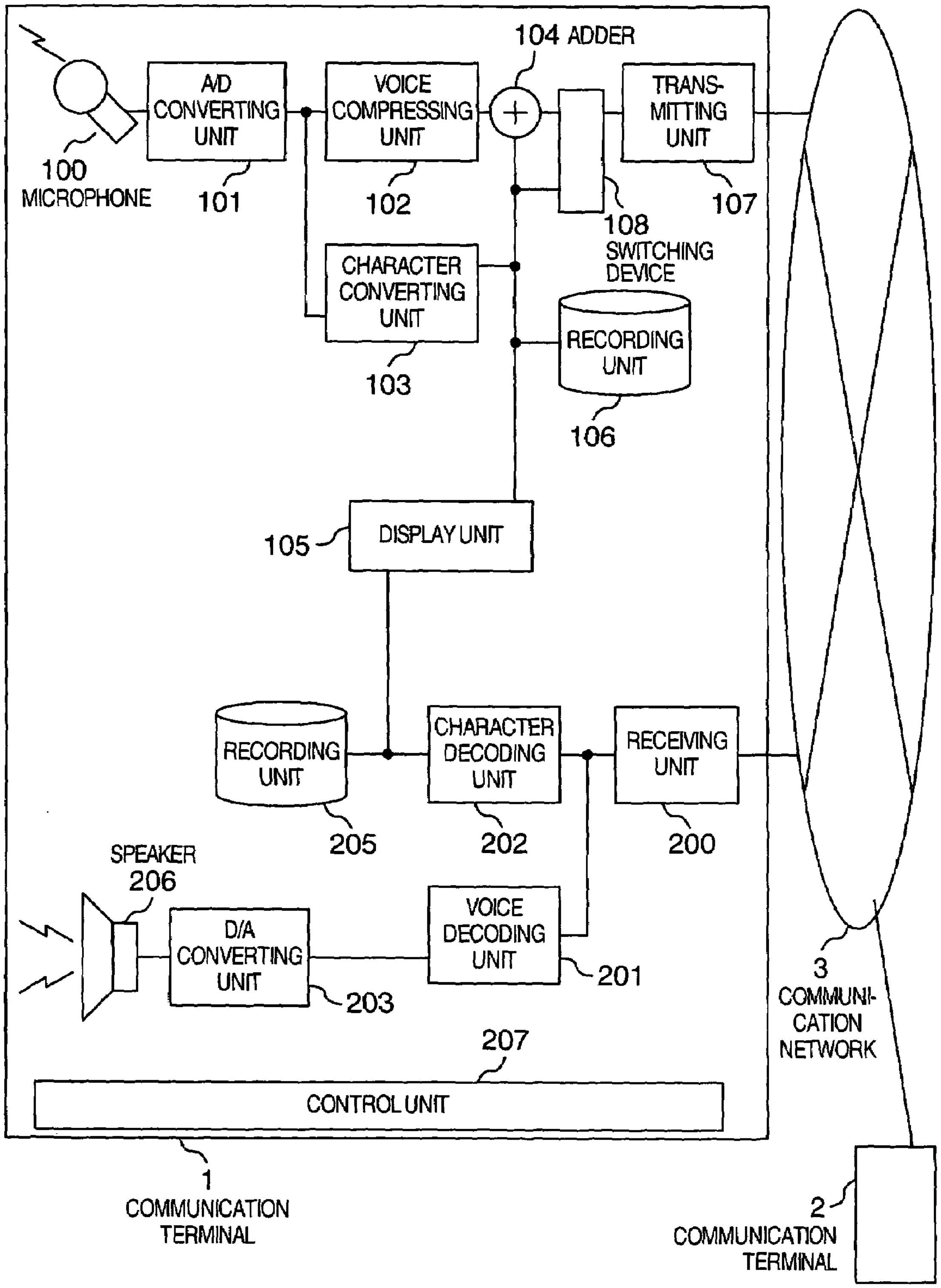
FIG. 1 is a schematic block diagram for indicating an arrangement of a communication system according to an embodiment of the present invention.

FIG. 1 schematically shows an internal arrangement of a communication system according to an embodiment of the present invention. A communication terminal 1 and another communication terminal 2 correspond to communication terminals capable of transmitting/receiving data via a communication network 3, for instance, such communication terminals as portable telephones and PDAs (Personal Digital Assistants).

A first description will now be made of operations executed in the case that the communication terminal 1 transmits voice information and character information. An A/D converting unit 101 converts an analog voice signal obtained by a microphone 100 into a digital voice signal. The digitally-converted voice signal is inputted to both a voice compressing unit 102 and a character converting unit 103. The voice compressing unit 102 performs a data compressing operation of the above-described digital voice signal so as to reduce a data amount. Since the character converting unit 103 performs a speech recognition of the digital voice signal, this character converting unit 103 converts the voice information into character information. An adder 104 adds an output signal of the voice compressing unit 102 to an output signal of the character converting unit 103.

A switching device 108 switches an output signal from the adder 104 and the output signal from the character converting unit 103 to output the switched output signal to a transmitting unit 107 in response to an instruction of a control unit 207. The transmitting unit 107 transmits both voice data and character data, or character data via a communication network 3 to the communication terminal 2. Also, a recording unit 106 receives the output data from the character converting unit 103 so as to record the character information in this recording unit 106. A display unit 105 receives the output data from the character converting unit 103 so as to display thereon the character information converted from the voice signal.

Next, a description will now be made of operations executed in the case that the communication terminal 1 receives both voice information and character information. Data transmitted from a transmitting unit of the communication terminal 2 is received by a receiving unit 200.

An output of the receiving unit 200 is sent to both a voice decoding unit 201 and a character decoding unit 202. The voice decoding unit 201 decodes the digital signal supplied from the receiving unit 200 so as to derive a digital voice signal, and then sends this digital voice signal to a D/A converting unit 203. This D/A converting unit 203 converts the digital voice signal sent from the voice signal decoding unit 201 into an analog voice signal, and then, sends this analog voice signal to a speaker 206. The speaker 206 receives the analog voice signal sent from the D/A converting unit 203 to output voice. Also, the character decoding unit 202 decodes the digital signal supplied from the receiving unit 200 so as to derive character information, and then, sends the derived character information to both the display unit 105 and the recording unit 205. The recording unit 205 records therein the character information sent from the character decoding unit 202.

The display unit 105 receives the character information transmitted from the character decoding unit 202 and then displays thereon this received character information. Also, the display unit 105 is capable of displaying thereon character information read out from both the recording unit 106 and the recording unit 205. It should be noted that the recording units 106 and 205 may be realized by a hard disk, a RAM (Random Access Memory), or a dismountable storage medium such as an IC card.

Figure 2:
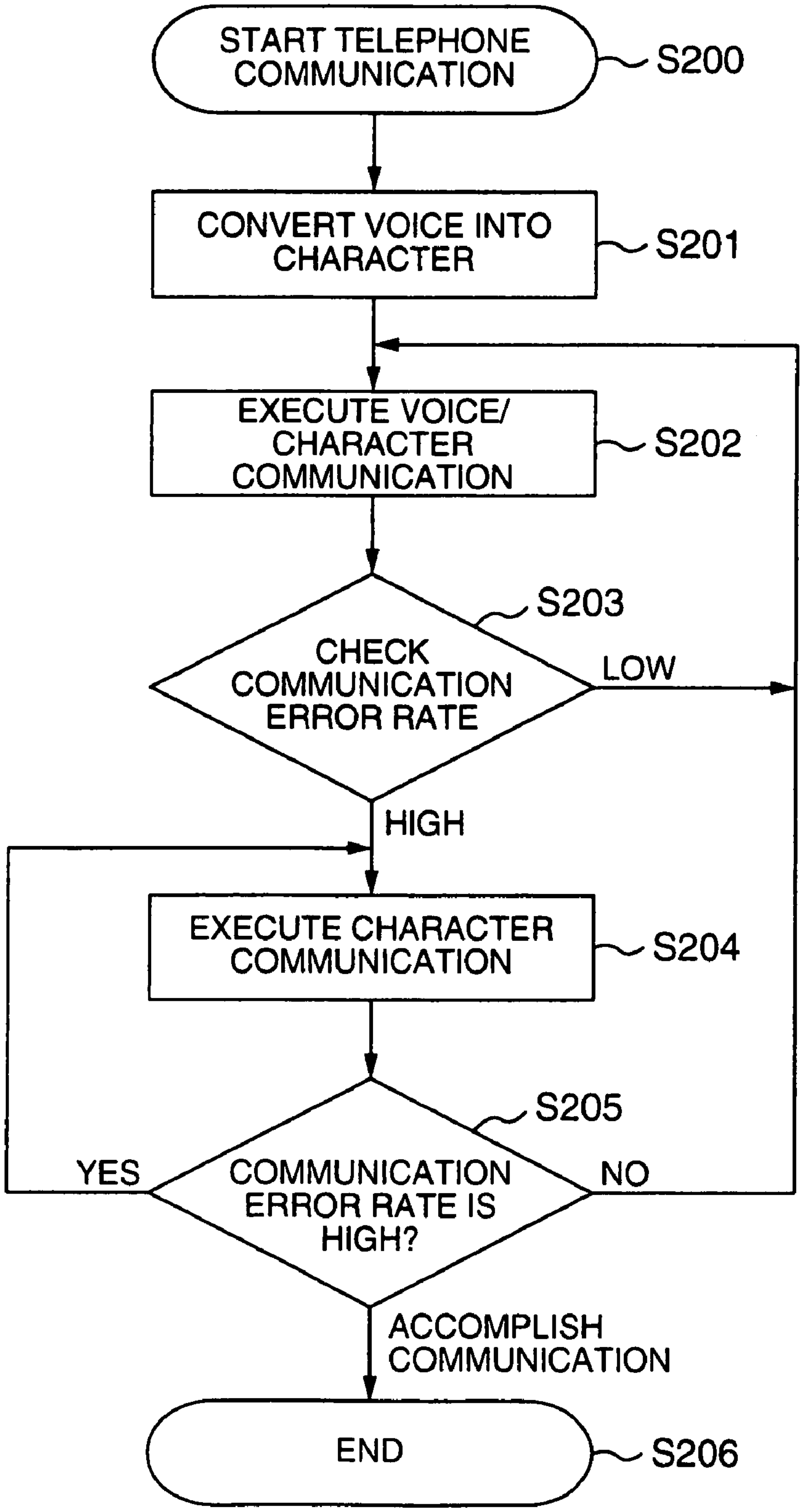
FIG. 2 is a flow chart for describing a communication sequence of a voice communication and a character communication executed in the communications system of FIG. 1.

FIG. 2 is a flow chart for describing a switching control operation between a voice/character communication and a character communication executed in the communication terminal 1 of FIG. 1. A control unit 207 shown in FIG. 1 may execute the below-mentioned control process operation in accordance with a program stored in the recording unit 106. It should also be noted that this program may have been previously installed in the communication terminal 1 when this communication terminal 1 is marketed, or may be arbitrarily installed after a user has purchased this communication terminal 1. In such a case that this user installs the program after the user has purchased the communication terminal 1, the user may access a server which has stored therein the program so as to download this program, and then, may store the downloaded program into the storage unit 106.

Since a telephone communication is commenced (step S200), the character converting unit 103 converts voice into character information by performing the speech recognition of a digital speech (voice) signal (step S201). The switching device 108 selects an output signal from the adder 104, and the voice/character communication is carried out by which both voice data and character data are transmitted from the transmitting unit 107 (step S202).

After a condition of the voice/character communication (step S202) has passed for a predetermined time (for example, 1 second), the control unit 207 executes a communication error rate check (step S203). In such a case that a total number of data resending operations by the transmitting unit 107 exceeds a preselected number, or a ratio of error corrections of data received by the receiving unit 200 exceeds a predetermined error correction ratio, the control unit 207 judges that the communication error rate is "High".

As a result of the communication error rate check (step S203), if a communication rate is low ("Low" in step S202), then the control unit 207 continuously performs the voice/character communication (step S202). When a communication rate is high ("High" in step S202), the switching device 108 selects an output signal from the character converting unit 103, and then, the transmitting unit 107 executes a character communication for transmitting character data (step S204). After a condition of the character communication (step S204) has passed for a predetermined time (for instance, 1 second), the control unit 207 executes a communication error rate check (step S205). When a communication error rate is high ("High" in step S205), the transmitting unit 107 continuously performs the character communication (step S204). When a communication error rate is low ("Low" in step S205), the switching device 108 selects an output signal from the adder 104 so as to switch this character communication to the voice/character communication (step S202).

Figure 4:
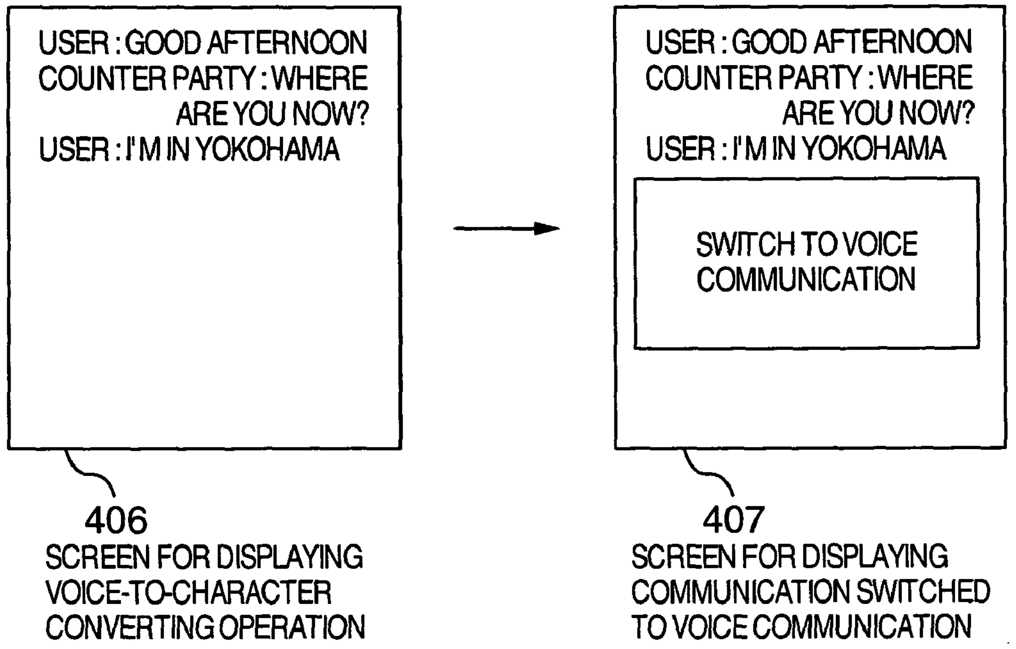
FIG. 4 illustratively shows an example of displays for switching from a character communication to a voice communication.

Next, a description will now be made of a means for notifying the switching operation between the voice communication and the character communication with respect to the user. When such a condition occurs that the communication error rate is high ("Yes" in step S203) while the voice/character communication is carried out, such sound (either alarm sound or voice of instructing communication switching) is produced from the speaker 206, which may inform switching to the character communication. When such a condition occurs that the communication error rate is low during the character communication ("No" in step S205), for example, as shown in FIG. 4, an indication for indicating that the character communication is switched to the voice communication is displayed on the display unit 105. Since the above-explained notification is made, it is possible to avoid a surprising attack against the user. Alternatively, the communication switching operation may be carried out in the case that a switching permission is issued from the user after such a notification has been made. As a consequence, it is possible to avoid such a happing case that the communications are switched irrespective of the user's will.

In this embodiment, the communication control is performed in such a manner that when the communication error rate is low, both the voice data and the character data are transmitted, whereas when the communication error rate is high, only the character data is transmitted. Since the character data amount is smaller than the voice data amount, even when a large amount of the correction code data made by the error correction coding method is added to the character data amount, the data increase amount thereof caused by the error correction coding method is also small because the original data amount thereof is small. Furthermore, even when the resending process operation is repeatedly carried out, since the data amount is small, the time duration required for the completion of the data transmission is short, and also a time difference is small. This time difference is defined by that after the speaker has started to talk, the talked content can be reached to the communication counter party. As a consequence, even under such a condition that the communication error rate is high, the communication can be maintained.

Also, even when the communication error rate is low, since the character data is transmitted in combination with the voice data, the receiver can confirm the telephone communication content even in such a case that the communication terminal provided on the reception side is not equipped with the converting unit capable of converting the voice information into the character information.

Further, in accordance with this embodiment, while the voice communication is carried out, the communication can be established by using the characters at the same time. Even in such a case that voice of the telephone communication counter party can be hardly heard under noisy environment, since the content talked by the counter party can be recognized based upon the character information, the user of this communication terminal can establish the telephone communication while confirming the content talked by the telephone communication counter party even if this user need not be moved to a quiet place.

Figure 3:
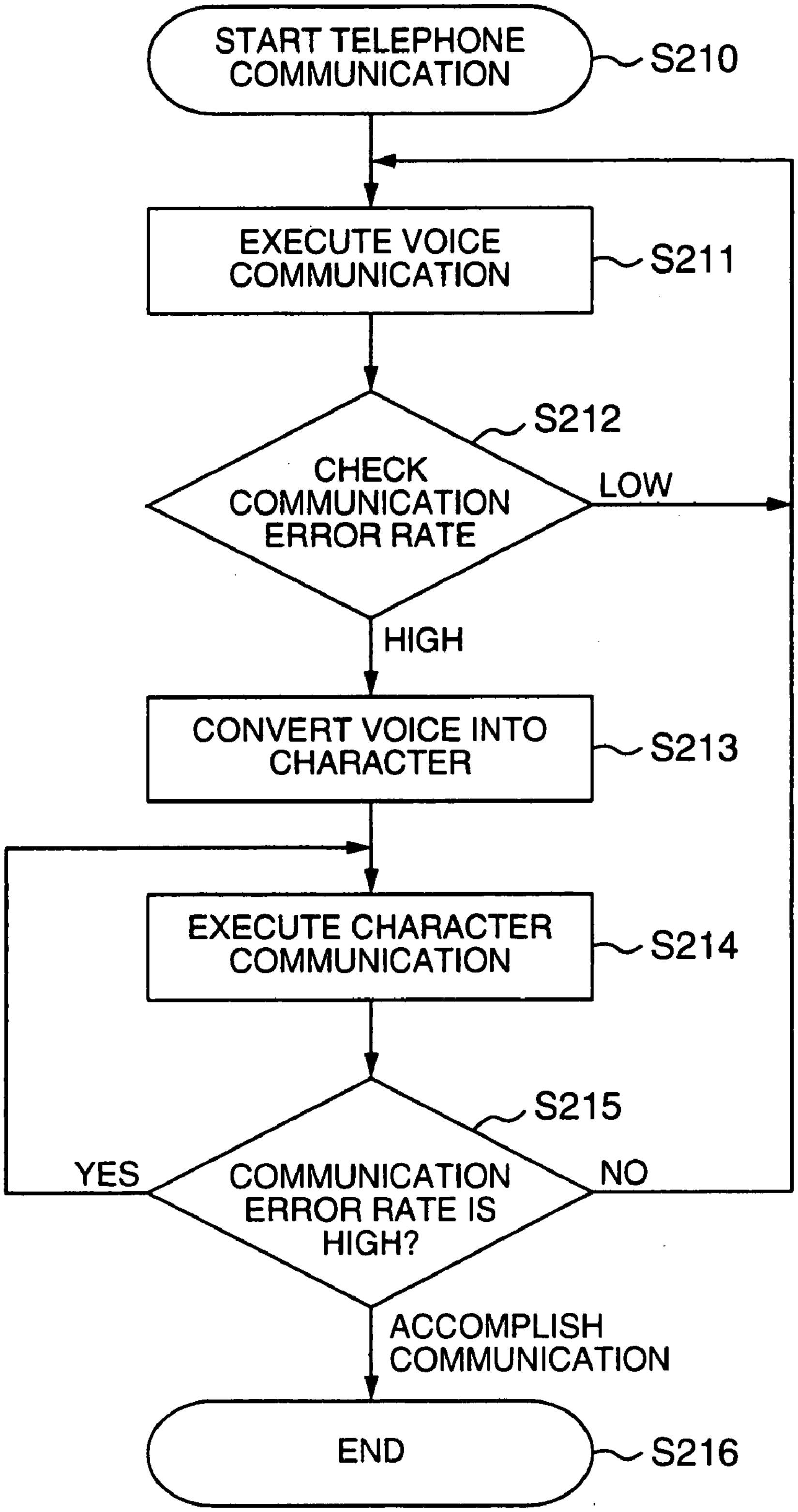
FIG. 3 is another flow chart for describing a communication sequence of a voice communication and a character communication executed in the communications system of FIG. 1.

It should be understood that the present invention is not limited only to the above-explained example, but may be applied to the following example. That is, as shown in FIG. 3, in the case that the communication error rate is low, the voice communication may be carried out (step S211), whereas in the case that the communication error rate is high, the voice-to-character converting operation by the character converting unit 103 may be commenced (step S213) to execute the character communication. In this alternative case, in the communication terminal 1 shown in FIG. 1, the voice data outputted from the voice compressing unit 102 is inputted into the switching device 108 so as to switch the voice data to the character data.

Alternatively, even in the case that the user selects not to transmit the character data, the voice-to-character converting operation by the character converting unit 103 may be carried out in connection with the commencement of the telephone communication. As a result, the content of the telephone communication may be displayed, or stored as the character information.

Also, the control unit 207 may perform the control operation in such a manner that the voice/character communications may be switched not only in the case that the communication condition is changed (for instance, communication error rate is high), but also in the case that the user requires to switch the voice/character communications. For example, such a communication capable of satisfying needs of the user may be carried out, while the user wants to perform only the character communication in order to suppress communication fees. Moreover, in the case that a communication switching request is received from a communication terminal of a communication counter party, the control unit 207 may instruct switching of the voice/character communication operations. As a result, in such a case that the communication condition on the reception side is deteriorated, even when the communication terminal provided on the reception side is not equipped with the voice/character converting function, since the voice communication is switched to the character communication in the communication terminal provided on the transmission side, interruptions in communications may be prevented.

Although not shown in FIG. 1, such a character converting unit for converting voice data received by the receiving unit 200 into character data may be alternatively provided in the communication terminal 1. As a result, even when a communication terminal provided on the transmission side is not equipped with the voice/character converting function, a telephone communication content may be displayed by way of characters, or may be recorded as character data. Also, a voice converting unit capable of converting character data received by the receiving unit 200 into voice may be provided in the communication terminal 1. As a result, even when only the character data is received, the telephone communication content thereof may be confirmed by way of voice.

Figure 5:
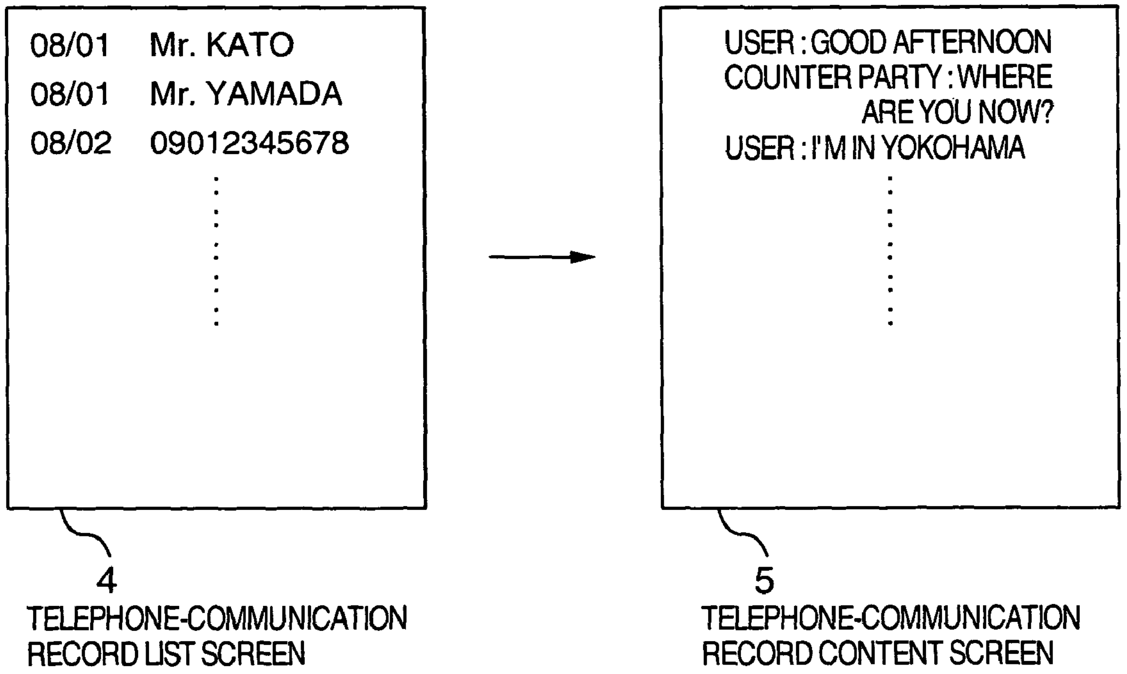
FIG. 5 illustratively indicates a display example of communication records.

FIG. 5 illustratively shows an example of a screen of the display unit 105 on which telephone communication contents recorded on both the recording units 106 and 205 are displayed. A telephone-communication record list screen 4 displays thereon starting date/time of telephone communications and identification information (either telephone number of communication counter party or name of communication counter party) of communication counter party. When one item is selected from the list displayed on the telephone-communication record list screen 4, this telephone-communication record list screen 4 is transferred to a telephone-communication record content screen 5. This telephone-communication record content screen 5 displays thereon such information read out from both the recording unit 106 and the recording unit 205. Since character information is recorded in combination with time information, the character information read out from the recording units 106 and 205 may be combined therewith to be displayed so as to reproduce a telephone communication content.

As a result, the user can view the telephone communication content as the characters while the user is making the telephone communication, or after the user finishes the telephone communication. Since the telephone communication content is recorded as the characters, this character data can be recorded with a smaller data capacity than such a data capacity that this telephone communication content is stored by way of a voice recording manner. Also, since the telephone communication content is recorded by way of the characters, the telephone communication can be easily retrieved and/or copied while the user is making the telephone communication and even after the user finishes the telephone communication. Furthermore, while time required for viewing a telephone communication content is determined by a speed at which a user reads characters, since these characters may be carefully read, or may be quickly read, the telephone communication content may be readily grasped.

It should also be noted that although the talked content is displayed in combination with the heard content on the display example of FIG. 5, the content talked by the user himself and the content talked by the communication counter party may be separately displayed thereon. Also, both the recording unit 106 and the recording unit 205 may be provided in an integral form. Alternatively, data which will be recorded on the recording units 106 and 205 are not limited only to character data, but both voice data and character data may be recorded.

Figure 6:
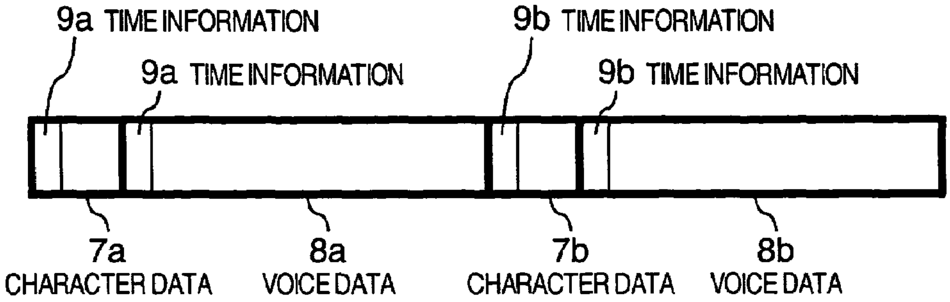
FIG. 6 is a diagram for schematically indicating an example of a recording format with respect to character data and voice data.

FIG. 6 indicates an example of a recording format as to both voice data 8 and character data 7. Both the character data 7 and the voice data 8 have been digitalized every constant time (for example, every 1 second). The character data 7 corresponds to such a character data produced by converting the voice data 8 as original data. The common time information 9 has been entered in the character data 7 and the voice data 8, respectively. As explained above, since the character data is recorded in combination with the voice data, the voice data may be easily retrieved. It should also be understood that such an information which is recorded in combination with the voice data 8 and the character data 7 is not limited only to the time information, but may be realized as recording position information indicative of a correspondence relationship between the voice data 8 and the character data 7.

Figure 7:
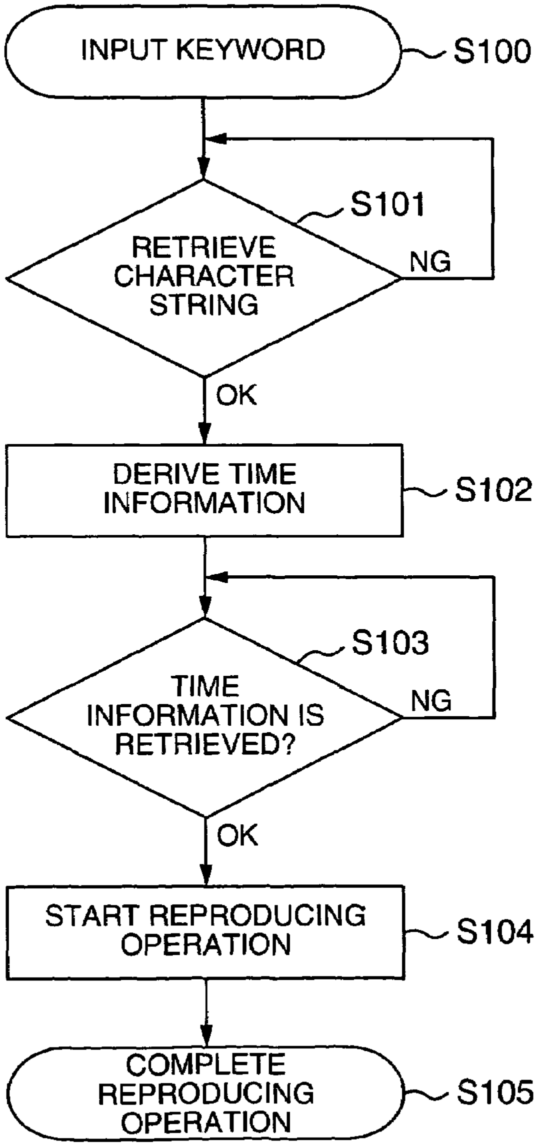
FIG. 7 is a flow chart for explaining a reproducing sequence of voice data.

Referring now to FIG. 7, a description will be made of such a method capable of retrieving voice data recorded on either the recording unit 106 or the recording unit 205 and of reproducing the retrieved voice data. In the case that the voice data is reproduced, the user enters a keyword (step S100). The character data 7 is retrieved based upon this keyword (step S101). The retrieving operation is repeatedly carried out until the keyword can be found out ("NG" in step S101). When the keyword is found out ("OK" in step S101), the time information 9 contained in this found character 7 is derived (step S102). Next, a retrieving operation is carried out as to such a voice data containing the same time information 9 as the derived time information 9 (step S103). When the voice data 8 having the same time information 9 is found out ("OK" in step S103), the reproducing operation is commenced from the data portion of the found voice data 8 (step S104).

As explained in this embodiment, since the character string retrieving operation is carried out while the character string entered by the user is employed as the keyword, head-speeking of the voice data 8 can be carried out, so that the telephone communication content can be easily confirmed by way of the voice manner.

Figure 8:
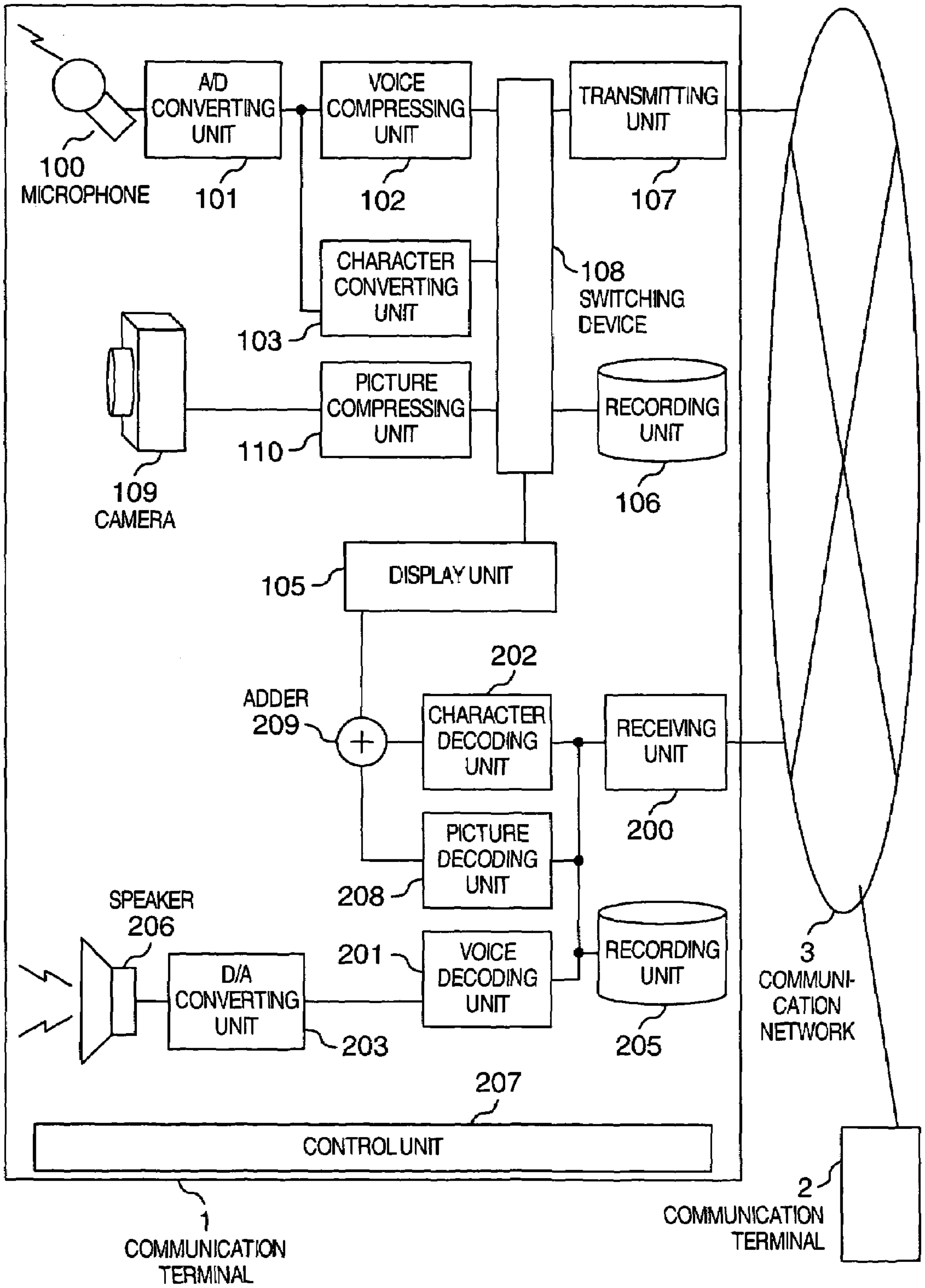
FIG. 8 is a schematic block diagram for indicating an arrangement of a communication system according to another embodiment of the present invention.

Also, although both the voice communication and the character communication are carried out in the communication terminal shown in FIG. 1, picture information may be transmitted/received in addition to this function. FIG. 8 schematically indicates an arrangement of a communication system capable of transmitting/receiving picture information, according to another embodiment of the present invention. It should be noted that the same reference numerals shown in FIG. 1 will be employed as those for denoting the same, or similar structural elements represented in this drawing, and explanations thereof are omitted.

In the communication system of FIG. 8, a picture compressing unit 110 compresses picture data photographed by a camera 109. Under control of a control unit 207, a switching device 108 switches the picture signal (picture data) compressed by the picture compressing unit 110, a voice signal (voice data) compressed by a voice compressing unit 102, and character data converted by a character converting unit 103, and then, outputs the switched signal. It should be noted that although not shown in this drawing, this selecting device 108 is equipped with an adder so as to add the voice information and the picture information to the character data in response to a communication condition, or a selection made by a user.

Figure 11:
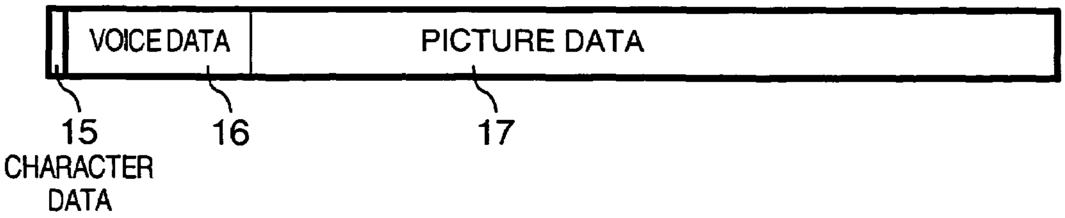
FIG. 11 is a diagram for schematically indicating an example of a character data amount, a voice data amount, and a picture data amount in the communication system of FIG. 8.

As represented in FIG. 11, when an amount of character data 15, an amount of voice data 16, and an amount of picture data 17 are compared with each other, generally speaking, the information amount of the character data 15 is smaller than the information amounts of the picture data 17 and of the voice data 16. As a consequence, a data dropout degree of the character data 15 is low, as compared with data dropout frequencies of the picture data 17 and the voice data 16. Therefore, in such a case that a communication condition is deteriorated, for example, a communication error rate is high, since a voice communication and/or a picture communication is switched to a character communication, a communication may be maintained.

A signal received by a receiving unit 200 is sent to a voice decoding unit 201, a character decoding unit 202, and a picture decoding unit 208. The signal sent to the picture decoding unit 208 is decoded, and then, the decoded signal is outputted as a picture signal. Both an output signal form the character decoding unit 202 and an output signal from the picture decoding unit 208 are entered into an adder 209. This adder 209 synthesizes the entered signals with each other, and then, outputs a picture signal obtained by synthesizing character information with the picture signal.

Figure 9:
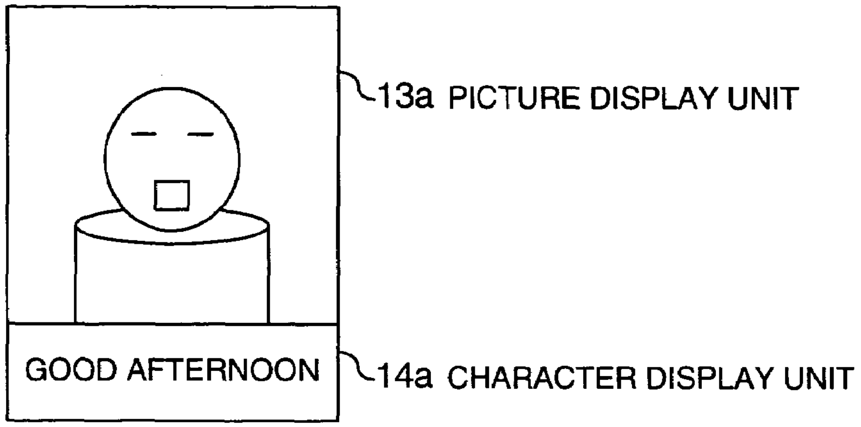
FIG. 9 illustratively shows a display example of data received in the communication system of FIG. 8.
Figure 10:
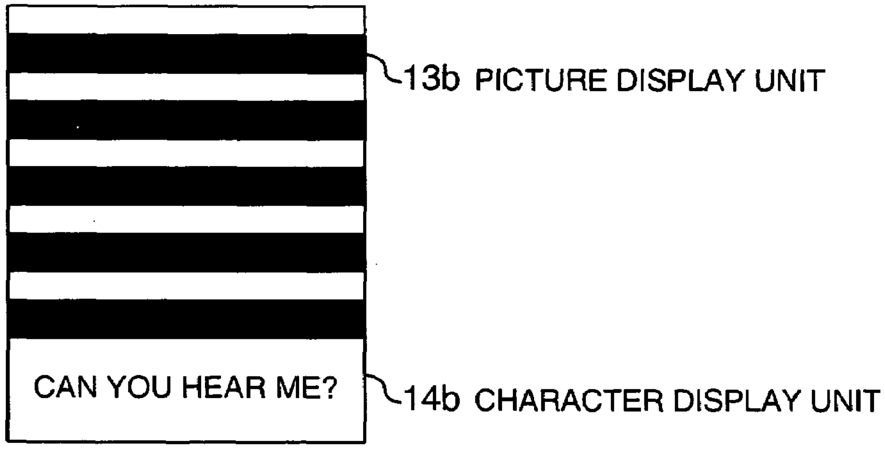
FIG. 10 illustratively indicates another display example of data received in the communication system of FIG. 8.

A display unit 105 may display thereon such a display content as shown in, for example, FIG. 9. In the display example of FIG. 9, the character information decoded by the character decoding unit 202 is displayed on a character display portion 14*a* at a lower display portion thereof, whereas the picture information decoded by the picture decoding unit 208 is displayed on a picture display portion 13*a* at an upper display portion thereof. Also, in the case that the picture signal cannot be decoded, for instance, such a display content as shown in FIG. 10 is displayed. Also, in this embodiment, such a data produced by converting voice as a character may be recorded on the recording units 106 and 205 in combination with a voice signal and a picture signal. As a consequence, since a character may be employed as a keyword in a retrieving operation, for example, a moving picture containing voice such as a conversation and a news delivery may be easily read out from the recording units 106 and 205 so as to be reproduced.

Figure 12:
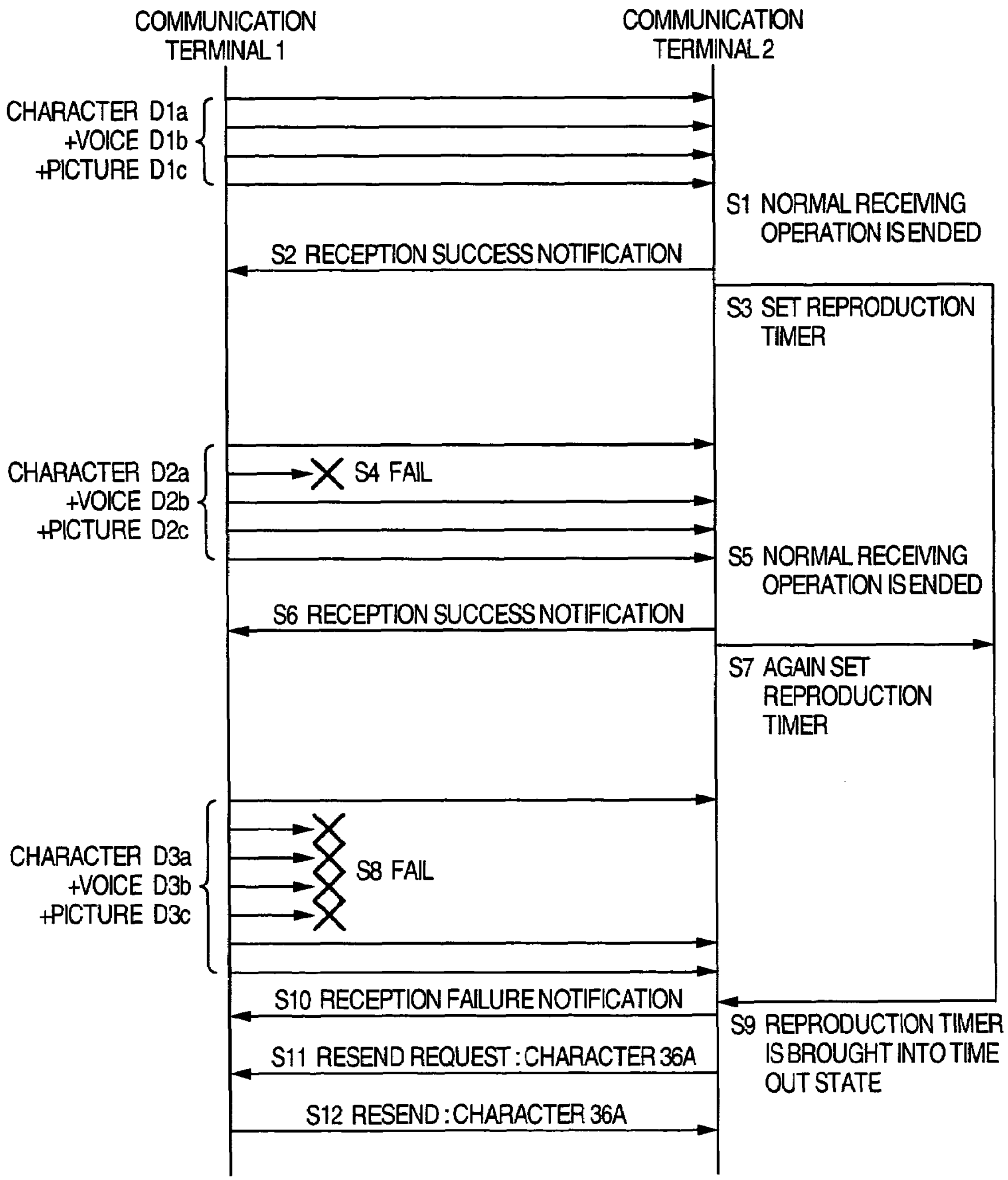
FIG. 12 shows a diagram for explaining sequential operation executed during data transmission/reception operations.

FIG. 12 is a sequence diagram for explaining such a case that data is transmitted from a communication terminal 1 to another communication terminal 2.

First, data as to a character D1*a*, voice D1*b*, and a picture D1*c* are transmitted from the communication terminal 1 to the communication terminal 2. At such a time instant when the normal data reception is accomplished (step S1), the communication terminal 2 transmits a reception success notification (step S2) to the communication terminal 1. Then the communication terminal 2 sets a reproduction timer (step S3) which notifies that such time duration required to reproduce both the received voice data and the received picture data has elapsed. Upon receipt of the reception success notification (step S2) from the communication terminal 2, the communication terminal 1 transmits such data as to a character D2*a*, voice D2*b*, and a picture D2*c*, which will be transmitted at a next stage from a transmission-sided communication terminal 10 to a reception-sided communication terminal 11. In the case that a transmission failure happens to occur during transmission operation (step S4), data subsequent to such a data when the transmission failure happens to occur is resent, and then, the data transmission from the communication terminal 1 to the communication terminal 2 can be accomplished under normal condition (step S5). Thereafter, a reception success notification (step S6) is transmitted from the communication terminal 2 to the communication terminal 1, and then, the reproduction timer is again set (step S7). As a result, the characters, the voice, and the pictures can be transmitted without any interruption.

Next, such data as to a character D3*a*, voice D3*b*, a picture D3*c*, which will be sent, are transmitted from the communication terminal 1 to the communication terminal 2. When a communication environment is deteriorated, a data transmission can be hardly carried out, so that a frequency of transmission failure (step S8) is increased. In such a case that the reproduction time is brought into a time out state (step S9) before all data of the character D3*a*, the voice D3*b*, and the picture D3*c* are reached to the communication terminal 1, a reception failure notification (step S10) is transmitted from the communication terminal 2 to the communication terminal 1. In this case, when the data reception of the character D3*a* has not yet been accomplished, a resend request of the character D3*a* (step S1) is issued, and thus, the transmission-sided communication terminal 10 resends only the character D3*a* (step S12).

The time out state of the reproduction timer (step S9) implies that the reproducing operation as to the voice D2*b* and the picture D2*c*, which have been received, is completed, and thus, there is no data to be reproduced. In such a case that pictures and voice are reproduced in a continuous manner, such data which are continuously reproduced must be present. In other words, the time instant when the time out state of the reproduction timer (step S9) happens to occur may imply such a fact that a communication established by both voice and pictures in a real time mode is interrupted. However, in the case of the character communication, even when the data is again received after a little time rest, since the user may immediately read the characters, such a temporarily dropped time may be embedded, which may avoid such a fact that the communication is completely interrupted.

As previously explained, in accordance with the communication system of this embodiment, even when the electromagnetic wave condition is deteriorated, since the communication is made in combination with the characters, even when the communication-impossible time caused by the voice and the pictures is intermittently made, the communication interruption can be avoided by transmitting/receiving the telephone communication contents by using the characters. Also, even under noisy peripheral environment, since the character communication is employed, the communication may be supported by the auxiliary manner. In other words, even in such a case that the communication condition is deteriorated, the information may be transmitted/received.

Also, since the telephone communication contents may be recorded by way of the character information, such telephone communication contents may be stored by a smaller data amount, as compared with such a data amount that the voice communication contents are directly recorded. Also, since the stored data are the characters, the retrieving operation and the citation operation may be easily carried out based upon these stored characters, and further, these characters may be readily utilized when large amounts of data are stored.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A communication terminal comprising:

a voice input unit which inputs voice;

a voice converter which converts the voice input by the voice input unit into a voice signal;

a character converter which converts the voice signal converted by the voice converter into a character signal;

a transmitter which transmits the voice signal and the character signal via a communication line;

a controller which executes a communication error rate check of the communication line at predetermined time intervals after the transmitter starts a signal transmission, and controls the transmitter in such a manner that the transmitter transmits the voice signal or the character signal in response to the error rate; and a notifier which outputs information indicating a communication switching when the transmitter switches to voice signal transmission or character signal transmission.

2. A communication terminal according to claim 1 wherein:

the controller controls the transmitter in such a manner that the transmitter transmits the character signal when the error rate is higher than a predetermined value and the transmitter transmits the voice signal when the error rate is equal or less than the predetermined value.

3. A communication terminal according to claim 1 wherein:

the communication terminal is comprised of a memory for storing therein both voice signal and the character signal.

4. A communication terminal according to claim 3 wherein:

the memory stores therein time information in combination with the voice signal and the character signal.

5. A communication terminal according to claim 4 wherein:

the communication terminal is comprised of a character input unit which inputs a character, and reads a voice signal from the memory in response to time information of a character signal corresponding to the character input by the character input unit.

* * * * *